(12) United States Patent
Lee et al.

(10) Patent No.: US 10,428,919 B2
(45) Date of Patent: Oct. 1, 2019

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Kyeong Hun Lee, Seoul (KR); Jong Sool Park, Hwaseong-si (KR); Jong Soo Kim, Seoul (KR); Dong Hwan Hwang, Seoul (KR); Jin Ho Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 203 days.

(21) Appl. No.: 15/803,254

(22) Filed: Nov. 3, 2017

(65) Prior Publication Data
US 2019/0024767 A1 Jan. 24, 2019

(30) Foreign Application Priority Data
Jul. 18, 2017 (KR) .................. 10-2017-0090831

(51) Int. Cl.
*F16H 37/04* (2006.01)
*F16H 3/66* (2006.01)
(52) U.S. Cl.
CPC ............ *F16H 37/04* (2013.01); *F16H 3/666* (2013.01); *F16H 2037/047* (2013.01); *F16H 2200/006* (2013.01); *F16H 2200/2012* (2013.01); *F16H 2200/2043* (2013.01)

(58) Field of Classification Search
CPC ................. F16C 2200/2012; F16C 2200/2043
See application file for complete search history.

(56) References Cited

U.S. PATENT DOCUMENTS

| | | | | |
|---|---|---|---|---|
| 8,113,978 | B2 * | 2/2012 | Phillips | .................. F16H 3/666 475/210 |
| 8,388,485 | B2 * | 3/2013 | Phillips | .................. F16H 3/666 475/211 |
| 2014/0371023 | A1 * | 12/2014 | Janson | ...................... F16H 3/66 475/275 |
| 2015/0031496 | A1 * | 1/2015 | Hoffman | .................. F16H 3/66 475/280 |
| 2019/0011028 | A1 * | 1/2019 | Lee | ......................... F16H 37/04 |

* cited by examiner

*Primary Examiner* — Tisha D Lewis
(74) *Attorney, Agent, or Firm* — Brinks Gilson & Lione (57) ABSTRACT

A planetary gear train includes: first to fourth planetary gear sets respectively having first to third, fourth to sixth, seventh to ninth, and tenth to twelfth rotational elements; an input shaft axial to the first to third planetary gear sets; and an output shaft axial to the fourth planetary gear set. In particular, the first and fourth rotational elements, the second rotational element and the input shaft, the fifth and eighth rotational elements, and the eleventh rotational element and the output shaft are fixedly interconnected by first, second, fourth, and ninth shafts respectively. Moreover, the third, sixth, seventh, and ninth rotational elements are fixedly connected with third, fifth, sixth, and seventh shafts respectively, an eighth shaft is fixedly connected with the tenth rotational element and externally gear-meshed with the sixth shaft, and a tenth shaft fixedly connected with the twelfth rotational element and externally gear-meshed with the fourth shaft.

13 Claims, 4 Drawing Sheets

| Shift-stage | Clutch | | | Brake | | Gear ratio | Step ratio | Remark |
|---|---|---|---|---|---|---|---|---|
| | C1 | C2 | C3 | B1 | B2 | | | |
| REV | | | ● | ● | ● | -3.077 | | |
| N | | | | ● | ● | - | - | |
| D1 | ● | | | ● | ● | 5.29 | - | |
| D2 | ● | ● | | | ● | 3.447 | 1.535 | Gear ratio span : 8.11 |
| D3 | | ● | ● | | ● | 2.26 | 1.525 | R/D1 ratio : -0.58 |
| D4 | | ● | ● | | ● | 1.767 | 1.279 | |
| D5 | ● | | ● | | ● | 1.36 | 1.299 | |
| D6 | ● | ● | ● | | | 1 | 1.360 | |
| D7 | ● | | ● | ● | | 0.814 | 1.229 | |
| D8 | | ● | ● | ● | | 0.652 | 1.248 | |

| Shift-stage | Clutch | | | Brake | | Gear ratio | Step ratio | Remark |
|---|---|---|---|---|---|---|---|---|
| | C1 | C2 | C3 | B1 | B2 | | | |
| REV | | | ● | ● | ● | -3.925 | - | |
| N | | | | ● | ● | - | - | |
| D1 | ● | | | ● | ● | 5.530 | - | |
| D2 | ● | ● | | ● | ● | 3.504 | 1.578 | |
| D3 | | ● | | | ● | 2.289 | 1.531 | |
| D4 | | ● | ● | | ● | 1.806 | 1.267 | Gear ratio span : 8.72 |
| D5 | ● | | ● | | ● | 1.356 | 1.332 | R/D1 ratio : -0.71 |
| D6 | ● | | ● | | | 1.000 | 1.356 | |
| D7 | ● | ● | ● | ● | | 0.817 | 1.224 | |
| D8 | | ● | ● | ● | | 0.634 | 1.289 | |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2017-0090831, filed on Jul. 18, 2017, which is incorporated herein by reference in its entirety.

FIELD

The present disclosure relates to an automatic transmission for a vehicle.

BACKGROUND

The statements in this section merely provide background information related to the present disclosure and may not constitute prior art.

Recently, increase of oil price leads to more competition to enhance fuel efficiency in automotive industry.

In this sense, research on an automatic transmission has been performed to simultaneously provide better drivability and fuel consumption by achieving more shift stages.

In order to achieve more shift stages for an automatic transmission, the number of parts is typically increased. This negatively affects installability, production cost, weight and/or power flow efficiency.

Therefore, in order to maximally enhance fuel efficiency and to lower manufacturing cost of an automatic transmission via multi shift stages, it is important to reduce number of parts of the transmission.

In this background, an eight-speed automatic transmission has been introduced recently to perform more shift stages via planetary gear trains for an automatic transmission.

However, we have discovered that disclosed automatic transmissions of eight or more shift-stages typically include many components and thus may easily become lengthy.

The above information disclosed in this Background section is only for enhancement of understanding of the background of the present disclosure and therefore it may contain information that does not form the prior art that is already known to a person of ordinary skill in the art.

SUMMARY

The present disclosure provides a planetary gear train of an automatic transmission for a vehicle having advantages of realizing at least eight forward speeds and at least one reverse speed by a combination of four planetary gear sets, two external gears and five control elements, thereby providing improvement of power delivery performance and fuel consumption and improving installability by reducing the length of the transmission.

In addition, a wide available range of varying gear teeth of transfer gears enables easily obtaining desired gear ratios for respective vehicles, thereby improving power delivery performance and fuel consumption.

In one form of the present disclosure, a planetary gear train includes: a first planetary gear set having first, second, and third rotational elements, a second planetary gear set having fourth, fifth, and sixth rotational elements, a third planetary gear set having seventh, eighth, and ninth rotational elements, a fourth planetary gear set having tenth, eleventh, and twelfth rotational elements, an input shaft mounted with the first, second, and third planetary gear sets at an external circumference of the input shaft, and an output shaft disposed in parallel with the input shaft and mounted with the fourth planetary gear set on external circumference of the output shaft. An exemplary planetary gear train may further include a first shaft fixedly connected with the first rotational element and the fourth rotational element, a second shaft fixedly connected with the second rotational element and fixedly connected with the input shaft, a third shaft fixedly connected with the third rotational element, a fourth shaft fixedly connected with the fifth rotational element and the eighth rotational element, a fifth shaft fixedly connected with the sixth rotational element, a sixth shaft fixedly connected with the seventh rotational element, a seventh shaft fixedly connected with the ninth rotational element, an eighth shaft fixedly connected with the tenth rotational element and externally gear-meshed with the sixth shaft, a ninth shaft fixedly connected with the eleventh rotational element and connected with the output shaft, a tenth shaft fixedly connected with the twelfth rotational element and externally gear-meshed with the fourth shaft, and first and second transfer gears configured to form external gear-engagement with the corresponding shafts selected from the first to tenth shafts.

The sixth shaft may be selectively connected with the second shaft and third shaft respectively. The seventh shaft may be selectively connected with the third shaft. The first shaft and the fifth shaft may be selectively connected with a transmission housing respectively.

An exemplary planetary gear grain may further include a first clutch arranged between the second shaft and the sixth shaft, a second clutch arranged between the third shaft and the sixth shaft, a third clutch arranged between the third shaft and the seventh shaft, a first brake arranged between the first shaft and the transmission housing, and a second brake arranged between the fifth shaft and the transmission housing.

The first transfer gear is arranged between the fourth shaft and the tenth shaft, and the second transfer gear is arranged between the sixth shaft and the eighth shaft.

The first planetary gear set may include a first sun gear, a first planet carrier, and a first ring gear as the first, second, and third rotational elements. The second planetary gear set may include a second sun gear, a second planet carrier, and a second ring gear as the fourth, fifth, and sixth rotational elements. The third planetary gear set may include a third sun gear, a third ring gear, and a third planet carrier as the seventh, eighth, and ninth rotational elements. The fourth planetary gear set may include a fourth sun gear, a fourth planet carrier, and a fourth ring gear as the tenth, eleventh, and twelfth rotational elements.

The first planetary gear set may include a first sun gear, a first planet carrier, and a first ring gear as the first, second, and third rotational elements. The second planetary gear set may include a second sun gear, a second planet carrier, and a second ring gear as the fourth, fifth, and sixth rotational elements. The third planetary gear set may include a third planet carrier, a third ring gear, and a third sun gear as the seventh, eighth, and ninth rotational elements. The fourth planetary gear set may include a fourth sun gear, a fourth planet carrier, and a fourth ring gear as the tenth, eleventh, and twelfth rotational elements.

The first, second, and third planetary gear sets may be arranged in the order of the third, first, and second planetary gear sets from an engine side.

According to a planetary gear train according to an exemplary form of the present disclosure, planetary gear sets are dividedly arranged on input and output shafts disposed in parallel, thereby reducing a length and improving installability.

According to a planetary gear train according to an exemplary form of the present disclosure, at least eight forward speeds and at least one reverse speed may be realized by employing two transfer gears in addition to a combination of planetary gear sets, thereby providing a wide range of varying gear teeth so as to easily achieve optimum gear ratio and to easily comply with desired performance for respective vehicles.

In addition, according to a planetary gear train according to an exemplary form of the present disclosure, a gear ratio span of more than 8.0 may be achieved while realizing at least eight forward speeds and at least one reverse speed, thereby increasing an engine driving efficiency.

In addition, the linearity of step ratios of shift stages is secured while multi-staging the shift stage with high efficiency, thereby making it possible to improve drivability such as acceleration before and after a shift, an engine speed rhythmic sense, and the like.

In addition, a planetary gear train according to an exemplary form of the present disclosure utilizes five engagement elements thereby reducing the number of parts employed to achieve the shift stages, and reduces the number of non-engaged elements thereby reducing a drag loss and enhancing efficiency and fuel economy.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

Here, the term "fixedly connected" or the like means at least two members are connected to each other to always rotate together. Therefore, it is to be understood by a person of an ordinary skill in the art that the term "fixedly connected" or the like differs from the term "operably connected" or the like.

Figure 1:
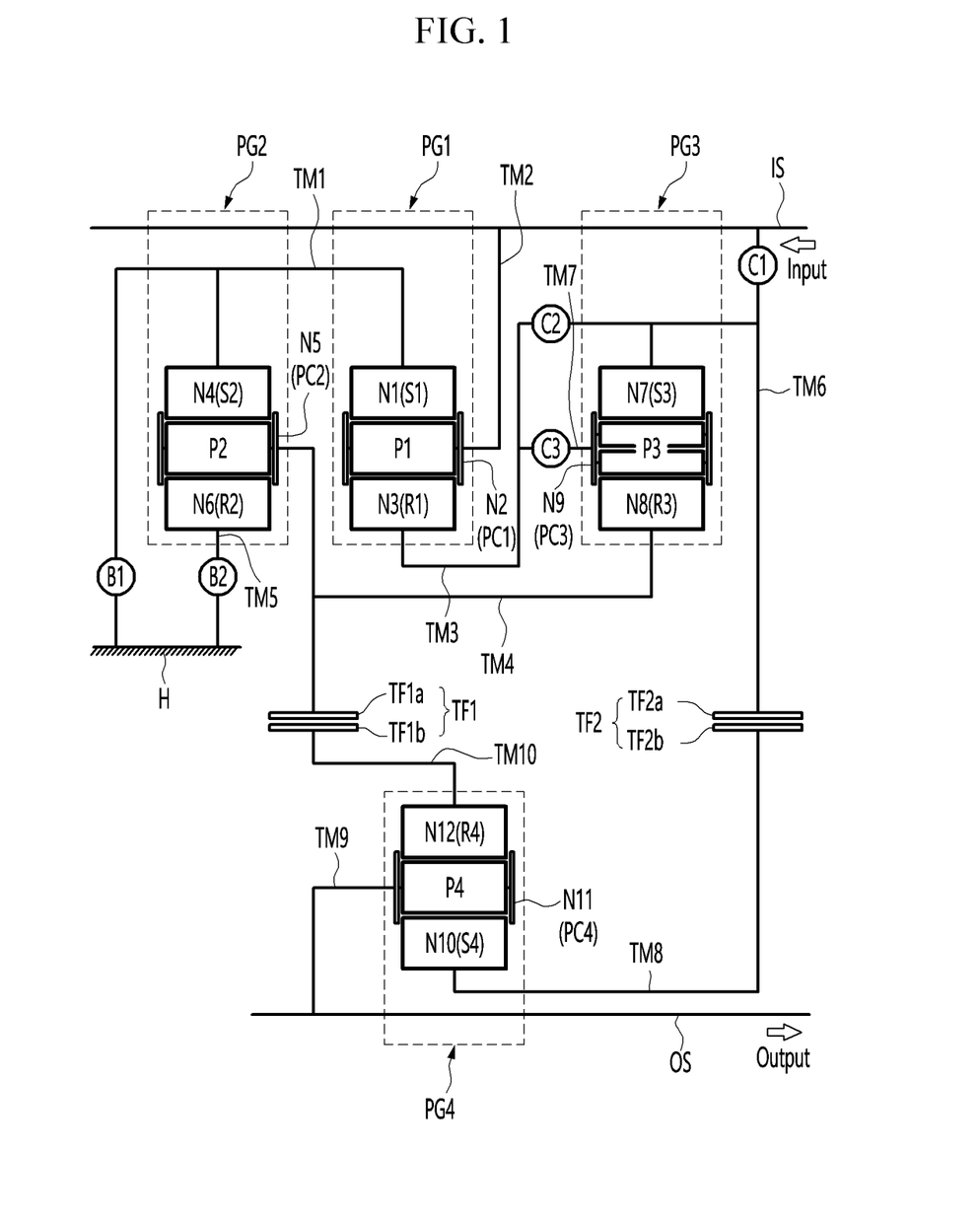
FIG. 1 is a schematic diagram of a planetary gear train according to a first exemplary form of the present disclosure.

FIG. 1 is a schematic diagram of a planetary gear train according to a first exemplary form of the present disclosure.

Referring to FIG. 1, a planetary gear train includes: an input shaft IS, an output shaft OS, first, second, third, and fourth planetary gear sets PG1, PG2, PG3, and PG4, two transfer gears TF1 and TF2, and engagement elements of three clutches C1, C2, and C3 and two brakes B1 and B2.

The input shaft IS is an input member and the torque from a crankshaft of an engine is input into the input shaft IS, after being torque-converted through a torque converter.

The output shaft OS is an output member, and, arranged in parallel with the input shaft IS, outputs a shifted driving torque to a drive shaft through a differential apparatus.

The first, second, and third planetary gear sets PG1, PG2, and PG3 are arranged at external circumference of the input shaft IS and form a main shifting portion. The first, second, and third planetary gear sets PG1, PG2, and PG3 are arranged in the order of the third, the first and second planetary gear sets PG3, and the PG1, and PG2, from an engine side.

The fourth planetary gear set PG4 is arranged at external circumference of the output shaft OS disposed in parallel with the input shaft IS and forms an auxiliary shifting portion.

The first planetary gear set PG1 is a single pinion planetary gear set, and includes a first sun gear S1, a first planet carrier PC1 that supports first pinion P1 externally engaged with the first sun gear S1, and a first ring gear R1 that is internally engaged with the first pinion P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports second pinion P2 externally engaged with the second sun gear S2, and a second ring gear R2 that is internally engaged with the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a double pinion planetary gear set, and includes a third sun gear S3, a third ring gear R3 that is internally gear-meshed with a third pinion P3 externally gear-meshed with the third sun gear S3, and a third planet carrier PC3 that supports the third pinion P3. The third sun gear S3 acts as a seventh rotational element N7, the third ring gear R3 acts as an eighth rotational element N8, and the third planet carrier PC3 acts as a ninth rotational element N9.

The fourth planetary gear set PG4 is a single pinion planetary gear set, and includes a fourth sun gear S4, a fourth planet carrier PC4 that supports fourth pinion P4 externally engaged with the fourth sun gear S4, and a fourth ring gear R4 that is internally engaged with the fourth pinion P4. The fourth sun gear S4 acts as a tenth rotational element N10, the fourth planet carrier PC4 acts as an eleventh rotational element N11, and the fourth ring gear R4 acts as a twelfth rotational element N12.

In the first, second, and third planetary gear sets PG1, PG2, and PG3, the first rotational element N1 is fixedly connected with the fourth rotational element N4, the fifth rotational element N5 is fixedly connected with the eighth rotational element N8, and seven shafts TM1 to TM7 are formed.

Three shafts TM8 to TM10 are connected to the fourth planetary gear set PG4.

The ten shafts TM1 to TM10 are hereinafter described in detail.

The first shaft TM1 is fixedly connected with first rotational element N1 (first sun gear S1) and fourth rotational element N4 (second sun gear S2), and selectively connected with the transmission housing H.

The second shaft TM2 is fixedly connected with the second rotational element N2 (first planet carrier PC1), and fixedly connected with the input shaft IS, thereby always acting as an input element.

The third shaft TM3 is fixedly connected with the third rotational element N3 (first ring gear R1).

The fourth shaft TM4 is fixedly connected with fifth rotational element N5 (second planet carrier PC2) and eighth rotational element N8 (third ring gear R3).

The fifth shaft TM5 is fixedly connected with the sixth rotational element N6 (second ring gear R2), and selectively connected with the transmission housing H.

The sixth shaft TM6 is fixedly connected with the seventh rotational element N7 (third sun gear S3), and selectively connected with each of the second shaft TM2 (input shaft IS) and the third shaft TM3.

The seventh shaft TM7 is fixedly connected with the ninth rotational element N8 (third planet carrier PC3), and selectively connected with the third shaft TM3.

The eighth shaft TM8 is fixedly connected with the tenth rotational element N10 (fourth sun gear S4), and externally gear-meshed with the sixth shaft TM6.

The ninth shaft TM9 is fixedly connected with the eleventh rotational element N11 (fourth planet carrier PC4), and fixedly connected with the output shaft OS, thereby always acting as an output element.

The tenth shaft TM10 is fixedly connected with the twelfth rotational element N12 (fourth ring gear R4), and externally gear-meshed with the fourth shaft TM4.

The first and second transfer gears TF1 and TF2 of externally gear-meshed gear sets deliver a shifted torque of the main shifting portion having the first, second, and third planetary gear sets PG1, PG2, and PG3 to the auxiliary shifting portion having the fourth planetary gear set PG4.

The first transfer gear TF1 includes a first transfer gear TF1a fixedly connected with the fourth shaft TM4 and a first transfer gear TF1b fixedly connected with the tenth shaft TM10, and externally gear-meshes the fourth shaft TM4 and the tenth shaft TM10.

The second transfer gear TF2 includes a second transfer gear TF2a fixedly connected with the sixth shaft TM6 and a second transfer gear TF2b fixedly connected with the eighth shaft TM8, and externally gear-meshes the sixth shaft TM6 and the eighth shaft TM8.

As a result, respective shafts connected by the first and second transfer gears TF1 and TF2 rotate in opposite directions, and the gear ratios of the first and second transfer gears TF1 and TF2 may be preset in consideration of desired speed ratio of the transmission.

Each of the ten shafts TM1 to TM10 may be a rotational member that fixedly interconnects the input and output shafts and rotational elements of the planetary gear sets PG1, PG2, PG3, and PG4, or may be a rotational member that selectively interconnects a rotational element to the transmission housing H, or may be a fixed member fixed to the transmission housing H.

In the disclosure, when two or more members are described to be "fixedly connected", where the member may be any of a shaft, an input shaft, an output shaft, a rotational member, and a transmission housing, the fixedly connected members always rotate together such that they may rotate at a same speed and/or in a same direction.

When two or more members are described to be "selectively connected" by an engagement element, it means that the selectively connected members rotates separately when the engagement element is not engaged, and rotates at a same speed when the engagement element is engaged.

The engagement elements include three clutches C1, C2, and C3 and two brakes B1 and B2, and are arranged as follows.

The first clutch C1 is arranged between the second shaft TM2 and the sixth shaft TM6, such that the second shaft TM2 and the sixth shaft TM6 may selectively become integral.

The second clutch C2 is arranged between the third shaft TM3 and the sixth shaft TM6, such that the third shaft TM3 and the sixth shaft TM6 may selectively become integral.

The third clutch C3 is arranged between the third shaft TM3 and the seventh shaft TM7, such that the third shaft TM3 and the seventh shaft TM7 may selectively become integral.

The first brake B1 is arranged between the first shaft TM1 and the transmission housing H, such that the first shaft TM1 may selectively act as a fixed element.

The second brake B2 is arranged between the fifth shaft TM5 and the transmission housing H, such that the fifth shaft TM5 may selectively act as a fixed element.

The engagement elements of the first, second, and third clutches C1, C2, and C3 and the first and second brakes B1 and B2 may be realized as multi-plate hydraulic pressure friction devices that are frictionally engaged by hydraulic pressure, however, it should not be understood to be limited thereto, since various other configuration that are electrically controllable may be available.

Figure 2:
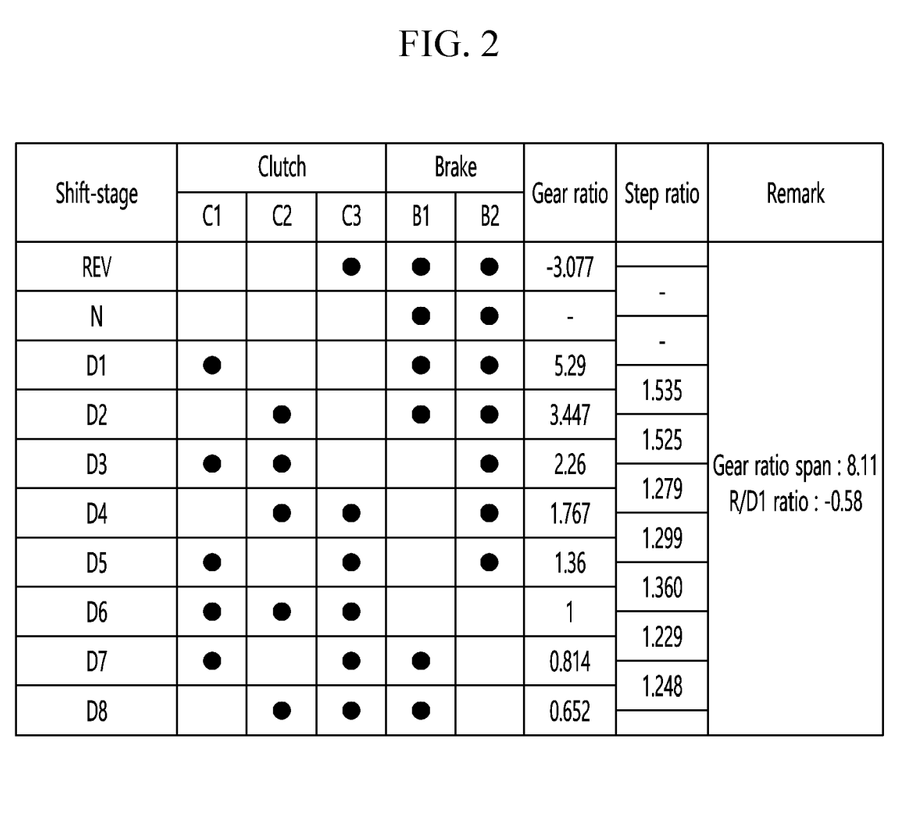
FIG. 2 is an operational chart for respective control elements at respective shift-stages in a planetary gear train according to a first exemplary form of the present disclosure.

FIG. 2 is an operational chart for respective control elements at respective shift-stages in a planetary gear train according to a first exemplary form of the present disclosure.

Referring to FIG. 2, a planetary gear train according to a first exemplary form of the present disclosure realizes shifting by operating three elements among the three clutches C1, C2, and C3 and the two brakes B1 and B2.

[The Forward First Speed]

In the forward first speed D1, the first clutch C1 and the first and second brakes B1 and B2 are simultaneously operated.

As a result, the second shaft TM2 is connected with the sixth shaft TM6 by the operation of the first clutch C1, the torque of the input shaft IS is input to the second shaft TM2, and the first, fifth shaft TM1 and TM5 acts as a fixed element by the operation of the first and second brakes B1 and B2, thereby realizing the forward first speed by cooperative operation of respective shafts and outputting a shifted torque to the output shaft OS connected with the ninth shaft TM9.

[The Forward Second Speed]

In the forward second speed D2, the second clutch C2 and the first and second brakes B1 and B2 are simultaneously operated.

As a result, the third shaft TM3 is connected with the sixth shaft TM6 by the operation of the second clutch C2, the torque of the input shaft IS is input to the second shaft TM2, and the first, fifth shaft TM1 and TM5 acts as a fixed element by the operation of the first and second brakes B1 and B2, thereby realizing the forward second speed by cooperative operation of respective shafts and outputting a shifted torque to the output shaft OS connected with the ninth shaft TM9.

[The Forward Third Speed]

In the forward third speed D3, the first and second clutch C1 and C2 and the second brake B2 are simultaneously operated.

As a result, the second shaft TM2 is connected with the sixth shaft TM6 by the operation of the first clutch C1, the third shaft TM3 is connected with the sixth shaft TM6 by the operation of the second clutch C2, the torque of the input shaft IS is input to the second shaft TM2, and the fifth shaft TM5 acts as a fixed element by the operation of the second brake B2, thereby realizing the forward third speed by cooperative operation of respective shafts and outputting a shifted torque to the output shaft OS connected with the ninth shaft TM9.

[The Forward Fourth Speed]

In the forward fourth speed D4, the second and third clutches C2 and C3 and the second brake B2 are simultaneously operated.

As a result, the third shaft TM3 is connected with the sixth shaft TM6 by the operation of the second clutch C2, the third shaft TM3 is connected with the seventh shaft TM7 by the operation of the third clutch C3, the torque of the input shaft IS is input to the second shaft TM2, and the fifth shaft TM5 acts as a fixed element by the operation of the second brake B2, thereby realizing the forward fourth speed by cooperative operation of respective shafts and outputting a shifted torque to the output shaft OS connected with the ninth shaft TM9.

[The Forward Fifth Speed]

In the forward fifth speed D5, the first and third clutches C1 and C3 and the second brake B2 are simultaneously operated.

As a result, the second shaft TM2 is connected with the sixth shaft TM6 by the operation of the first clutch C1, the third shaft TM3 is connected with the seventh shaft TM7 by the operation of the third clutch C3, the torque of the input shaft IS is input to the second shaft TM2, and the fifth shaft TM5 acts as a fixed element by the operation of the second brake B2, thereby realizing the forward fifth speed by cooperative operation of respective shafts and outputting a shifted torque to the output shaft OS connected with the ninth shaft TM9.

[The Forward Sixth Speed]

In the forward sixth speed D6, the first, second, and third clutches C1, C2, and C3 are simultaneously operated.

As a result, the second shaft TM2 is connected with the sixth shaft TM6 by the operation of the first clutch C1, the third shaft TM3 is connected with the sixth shaft TM6 by the operation of the second clutch C2, the third shaft TM3 is connected with the seventh shaft TM7 by the operation of the third clutch C3, and the torque of the input shaft IS is input to the second shaft TM2, thereby realizing the forward sixth speed by cooperative operation of respective shafts and outputting a shifted torque to the output shaft OS connected with the ninth shaft TM9.

[The Forward Seventh Speed]

In the forward seventh speed D7, the first and third clutches C1 and C3 and the first brake B1 are simultaneously operated.

As a result, the second shaft TM2 is connected with the sixth shaft TM6 by the operation of the first clutch C1, the third shaft TM3 is connected with the seventh shaft TM7 by the operation of the third clutch C3, the torque of the input shaft IS is input to the second shaft TM2, and the first shaft TM1 acts as a fixed element by the operation of the first brake B1, thereby realizing the forward seventh speed by cooperative operation of respective shafts and outputting a shifted torque to the output shaft OS connected with the ninth shaft TM9.

[The Forward Eighth Speed]

In the forward eighth speed D8, the second and third clutches C2 and C3 and the first brake B1 are simultaneously operated.

As a result, the third shaft TM3 is connected with the sixth shaft TM6 by the operation of the second clutch C2, the third shaft TM3 is connected with the seventh shaft TM7 by the operation of the third clutch C3, the torque of the input shaft IS is input to the second shaft TM2, and the first shaft TM1 acts as a fixed element by the operation of the first brake B1, thereby realizing the forward eighth speed by cooperative operation of respective shafts and outputting a shifted torque to the output shaft OS connected with the ninth shaft TM9.

[The Reverse Speed]

In the reverse speed REV, the third clutch C3 and the first and second brakes B1 and B2 are simultaneously operated.

As a result, the third shaft TM3 is connected with the seventh shaft TM7 by the operation of the third clutch C3, the torque of the input shaft IS is input to the second shaft TM2, and the first, fifth shaft TM1 and TM5 acts as a fixed element by the operation of the first and second brakes B1 and B2, thereby realizing the reverse speed by cooperative operation of respective shafts and outputting a reverse torque to the output shaft OS connected with the ninth shaft TM9.

Figure 3:
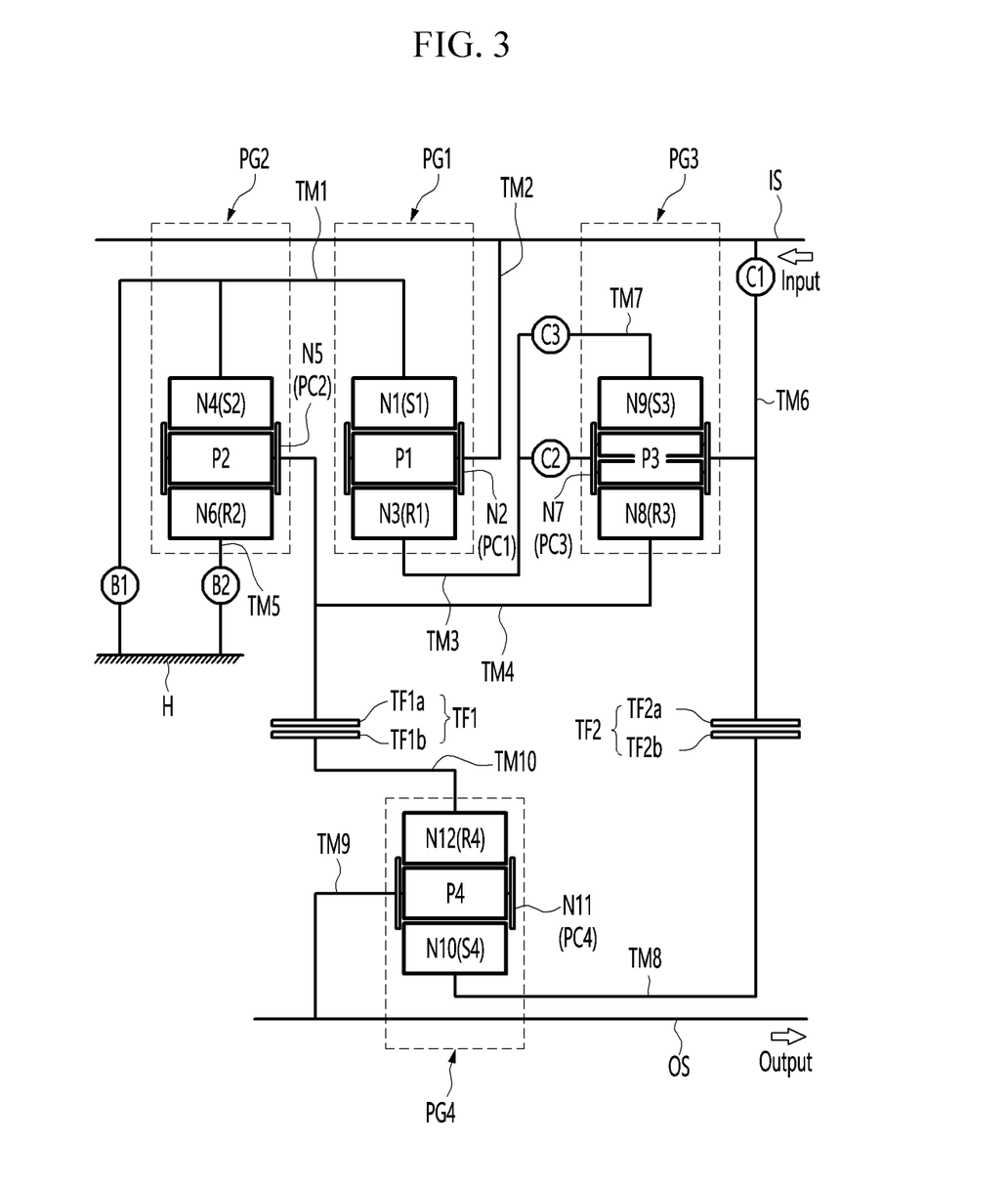
FIG. 3 is a schematic diagram of a planetary gear train according to a second exemplary form of the present disclosure.
Figure 4:
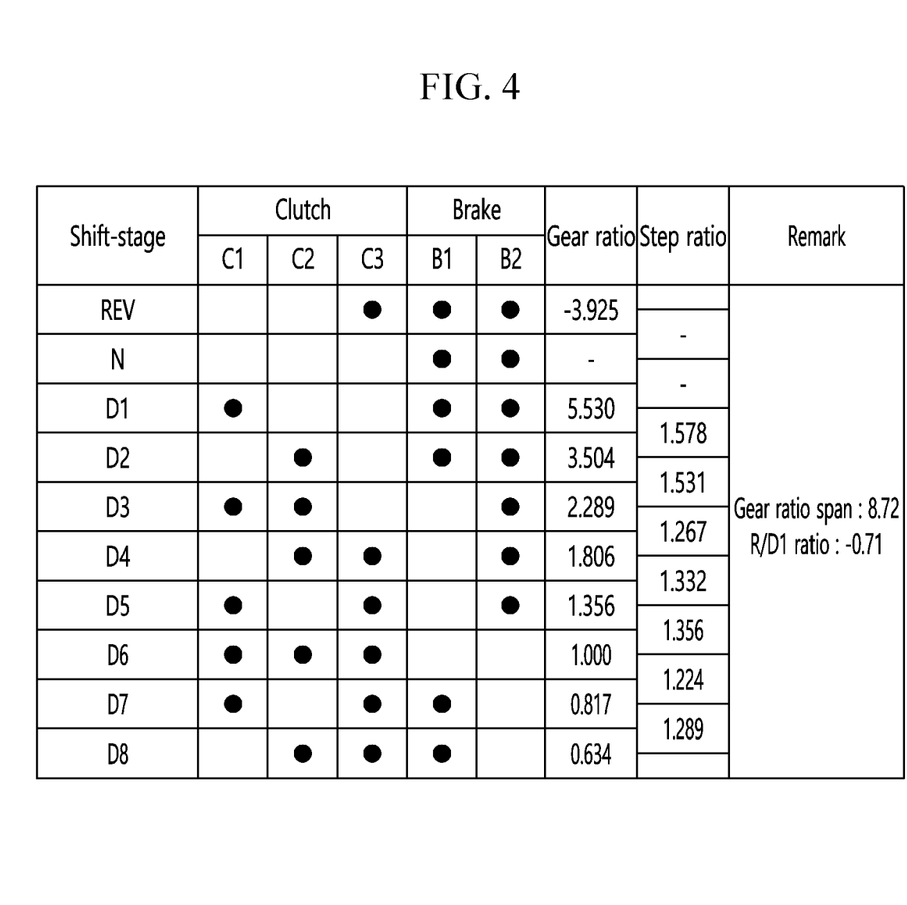
FIG. 4 is an operational chart for respective control elements at respective shift-stages in a planetary gear train according to a second exemplary form of the present disclosure.

FIG. 3 is a schematic diagram of a planetary gear train according to a second exemplary form of the present disclosure. FIG. 4 is an operational chart for respective control elements at respective shift-stages in a planetary gear train according to a second exemplary form of the present disclosure.

In a planetary gear train according to a first exemplary form of the present disclosure shown in FIG. 1, the third sun gear S3 acts as the seventh rotational element N7 and the third planet carrier PC3 acts as the ninth rotational element N9. However, referring to FIG. 3, the third planet carrier PC3 acts as the seventh rotational element N7 and the third sun gear S3 acts as the ninth rotational element N9 in a planetary gear train according to a second exemplary form.

That is, a planetary gear train according to the first and second exemplary form show that the seventh and ninth rotational element N7 and N9 are oppositely set and other cooperative relationship of other elements remains the same.

Referring to FIG. 2 and FIG. 4, a planetary gear train according to first and second exemplary form realizes respective shift-stages in the same way by operation of the same engagements, which is therefore not described in further detail.

It may be understood that gear ratios or step ratios may have different values since the seventh and ninth rotational elements N7 and N9 are replaced with each other.

As described above, according to a planetary gear train according to an exemplary form of the present disclosure, at least eight forward speeds and at least one reverse speed may be realized by a combination of four planetary gear sets, two transfer gears, and control elements of three clutches and two brakes, thereby providing improvement of power delivery performance and fuel consumption and improving installability by shortening the length of an automatic transmission.

In addition, according to a planetary gear train according to an exemplary form of the present disclosure, two transfer gears of external gears arranged on the output shaft OS are employed in addition to three planetary gear sets, and thus, gear teeth may be widely varied so as to easily achieve desired gear ratio and to easily comply with desired performance for respective vehicles.

In addition, according to a planetary gear train according to an exemplary form of the present disclosure, a gear ratio span of more than 8.0 may be achieved while realizing at least eight forward speeds and at least one reverse speed, thereby increasing an engine driving efficiency.

In addition, the linearity of step ratios of shift stages is secured while multi-staging the shift stage with high efficiency, thereby making it possible to improve drivability such as acceleration before and after a shift, an engine speed rhythmic sense, and the like.

In addition, a planetary gear train according to an exemplary form of the present disclosure utilizes five engagement elements thereby reducing the number of parts employed to achieve the shift stages, and reduces the number of non-engaged elements thereby reducing a drag loss and enhancing efficiency and fuel economy.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the appended claims.

DESCRIPTION OF SYMBOLS

PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
B1, B2: first and second brakes
C1, C2, C3: first, second, and third clutches
TF1, TF2: first and second transfer gears
TM1, TM2, TM3, TM4, TM5, TM6, TM7, TM8, TM9, TM10: first, second, third, fourth, fifth, sixth, seventh, eighth, ninth, and tenth shafts

What is claimed is:

1. A planetary gear train of an automatic transmission for a vehicle, the planetary gear train comprising:
a first planetary gear set having first, second, and third rotational elements;
a second planetary gear set having fourth, fifth, and sixth rotational elements;
a third planetary gear set having seventh, eighth, and ninth rotational elements;
a fourth planetary gear set having tenth, eleventh, and twelfth rotational elements;
an input shaft mounted with the first, second, and third planetary gear sets on an external circumference of the input shaft;
an output shaft disposed in parallel with the input shaft and mounted with the fourth planetary gear set on external circumference of the output shaft;
a first shaft fixedly connected with the first rotational element and the fourth rotational element;
a second shaft fixedly connected with the second rotational element and fixedly connected with the input shaft;
a third shaft fixedly connected with the third rotational element;
a fourth shaft fixedly connected with the fifth rotational element and the eighth rotational element;
a fifth shaft fixedly connected with the sixth rotational element;
a sixth shaft fixedly connected with the seventh rotational element;
a seventh shaft fixedly connected with the ninth rotational element;
an eighth shaft fixedly connected with the tenth rotational element and externally gear-meshed with the sixth shaft;
a ninth shaft fixedly connected with the eleventh rotational element and connected with the output shaft;
a tenth shaft fixedly connected with the twelfth rotational element and externally gear-meshed with the fourth shaft; and
first and second transfer gears configured to form external gear-engagement with the corresponding shafts selected from the first to tenth shafts.

2. The planetary gear train of claim 1, wherein:
the sixth shaft is selectively connected with the second shaft and third shaft respectively,
the seventh shaft is selectively connected with the third shaft, and
the first shaft and the fifth shaft are selectively connected with a transmission housing respectively.

3. The planetary gear train of claim 2, further comprising:
a first clutch arranged between the second shaft and the sixth shaft;
a second clutch arranged between the third shaft and the sixth shaft;
a third clutch arranged between the third shaft and the seventh shaft;
a first brake arranged between the first shaft and the transmission housing; and
a second brake arranged between the fifth shaft and the transmission housing.

4. The planetary gear train of claim 1, wherein the first transfer gear is arranged between the fourth shaft and the tenth shaft; and
the second transfer gear is arranged between the sixth shaft and the eighth shaft.

5. The planetary gear train of claim 1, wherein:
the first planetary gear set includes a first sun gear, a first planet carrier, and a first ring gear as the first, second, and third rotational elements;
the second planetary gear set includes a second sun gear, a second planet carrier, and a second ring gear as the fourth, fifth, and sixth rotational elements;

the third planetary gear set includes a third sun gear, a third ring gear, and a third planet carrier as the seventh, eighth, and ninth rotational elements; and the fourth planetary gear set includes a fourth sun gear, a fourth planet carrier, and a fourth ring gear as the tenth, eleventh, and twelfth rotational elements.

6. The planetary gear train of claim 1, wherein:

the first planetary gear set includes a first sun gear, a first planet carrier, and a first ring gear as the first, second, and third rotational elements;

the second planetary gear set includes a second sun gear, a second planet carrier, and a second ring gear as the fourth, fifth, and sixth rotational elements;

the third planetary gear set includes a third planet carrier, a third ring gear, and a third sun gear as the seventh, eighth, and ninth rotational elements; and the fourth planetary gear set includes a fourth sun gear, a fourth planet carrier, and a fourth ring gear as the tenth, eleventh, and twelfth rotational elements.

7. The planetary gear train of claim 1, wherein the first, second, and third planetary gear sets are arranged in the order of the third, first, and second planetary gear sets from an engine side.

8. A planetary gear train of an automatic transmission for a vehicle, the planetary gear train comprising:

a first planetary gear set having first, second, and third rotational elements;

a second planetary gear set having fourth, fifth, and sixth rotational elements;

a third planetary gear set having seventh, eighth, and ninth rotational elements;

a fourth planetary gear set having tenth, eleventh, and twelfth rotational elements;

an input shaft mounted with the first, second, and third planetary gear sets on an external circumference of the input shaft; and an output shaft disposed in parallel with the input shaft and mounted with the fourth planetary gear set on external circumference of the output shaft, wherein the first rotational element is fixedly connected with the fourth rotational element, the second rotational element is fixedly connected with the input shaft, the fifth rotational element is fixedly connected with the eighth rotational element, the seventh rotational element is selectively connected with the second rotational element and the third rotational element respectively, the ninth rotational element is selectively connected with the third rotational element, the tenth rotational element is externally gear-meshed with the seventh rotational element, the eleventh rotational element is fixedly connected with the output shaft, and the twelfth rotational element is externally gear-meshed with the fifth rotational element.

9. The planetary gear train of claim 8, wherein:

the first rotational element is selectively connected with a transmission housing;

the sixth rotational element is selectively connected with the transmission housing;

a first transfer gear is arranged between the fifth rotational element and the twelfth rotational element; and a second transfer gear is arranged between the seventh rotational element and the tenth rotational element.

10. The planetary gear train of claim 9, further comprising:

a first clutch configured to selectively connect the second rotational element and the seventh rotational element;

a second clutch configured to selectively connect the third rotational element and the seventh rotational element;

a third clutch configured to selectively connect the third rotational element and the ninth rotational element;

a first brake configured to selectively connect the first rotational element and the transmission housing; and a second brake configured to selectively connect the sixth rotational element and the transmission housing.

11. The planetary gear train of claim 8, wherein:

the first planetary gear set includes a first sun gear, a first planet carrier, and a first ring gear as the first, second, and third rotational elements;

the second planetary gear set includes a second sun gear, a second planet carrier, and a second ring gear as the fourth, fifth, and sixth rotational elements;

the third planetary gear set includes a third sun gear, a third ring gear, and a third planet carrier as the seventh, eighth, and ninth rotational elements; and the fourth planetary gear set includes a fourth sun gear, a fourth planet carrier, and a fourth ring gear as the tenth, eleventh, and twelfth rotational elements.

12. The planetary gear train of claim 8, wherein:

the first planetary gear set includes a first sun gear, a first planet carrier, and a first ring gear as the first, second, and third rotational elements;

the second planetary gear set includes a second sun gear, a second planet carrier, and a second ring gear as the fourth, fifth, and sixth rotational elements;

the third planetary gear set includes a third planet carrier, a third ring gear, and a third sun gear as the seventh, eighth, and ninth rotational elements; and the fourth planetary gear set includes a fourth sun gear, a fourth planet carrier, and a fourth ring gear as the tenth, eleventh, and twelfth rotational elements.

13. The planetary gear train of claim 8, wherein the first, second, and third planetary gear sets are arranged in the order of the third, first, and second planetary gear sets from an engine side.

* * * * *